(12) United States Patent
Billy et al.

(10) Patent No.: US 7,617,701 B2
(45) Date of Patent: Nov. 17, 2009

(54) PROCESS AND INSTALLATION FOR PROVIDING A FLUID MIXTURE CONTAINING AT LEAST 10% CARBON MONOXIDE

(75) Inventors: Jean Billy, Le Plessis Trevise (FR); Natacha Haik-Beraud, Nogent sur Marne (FR); Jean Gallarda, Joinville le Pont (FR); Franck Wegrzyn, Saint Maur des Fosses (FR)

(73) Assignee: L'Air Liquide, Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 10/557,012

(22) PCT Filed: Apr. 7, 2004

(86) PCT No.: PCT/IB2004/001086

§ 371 (c)(1),
(2), (4) Date: Nov. 14, 2005

(87) PCT Pub. No.: WO2004/102093

PCT Pub. Date: Nov. 25, 2004

(65) Prior Publication Data

US 2007/0056319 A1 Mar. 15, 2007

(30) Foreign Application Priority Data

May 19, 2003 (EP) .................................. 03291160

(51) Int. Cl.
*F25J 3/00* (2006.01)

(52) U.S. Cl. ............................. 62/625; 62/617; 62/631; 62/632; 62/920

(58) Field of Classification Search ................... 62/617, 62/625, 631, 632, 31, 920
See application file for complete search history.

(56) References Cited

U.S. PATENT DOCUMENTS

| 3,886,756 A | 6/1975 | Allam et al. |
| 4,102,659 A | 7/1978 | Martin |
| 4,311,496 A | 1/1982 | Fabian |

(Continued)

FOREIGN PATENT DOCUMENTS

EP 0 837 031 4/1998

(Continued)

*Primary Examiner*—Frantz F Jules
*Assistant Examiner*—Azim Rahim
(74) *Attorney, Agent, or Firm*—Elwood Haynes

(57) ABSTRACT

In a process for producing a mixture containing at least 10% carbon monoxide (73) by cryogenic separation of a feed gas containing at least carbon monoxide, hydrogen and methane, the feed gas (1) is separated to produce a first gas enriched in hydrogen (71), the feed gas is scrubbed in a methane wash column (7), a carbon monoxide enriched stream (13) from the bottom of the methane wash column is separated (19) to produce a stream further enriched in carbon monoxide (23), the stream further enriched in carbon monoxide is separated to form a carbon monoxide rich stream (31,49) and a liquid methane stream (27), at least part (72) of the carbon monoxide rich stream is mixed with the first gas enriched in hydrogen to form the mixture containing at least 10% carbon monoxide as a product stream.

18 Claims, 2 Drawing Sheets

U.S. PATENT DOCUMENTS

Figure 1:
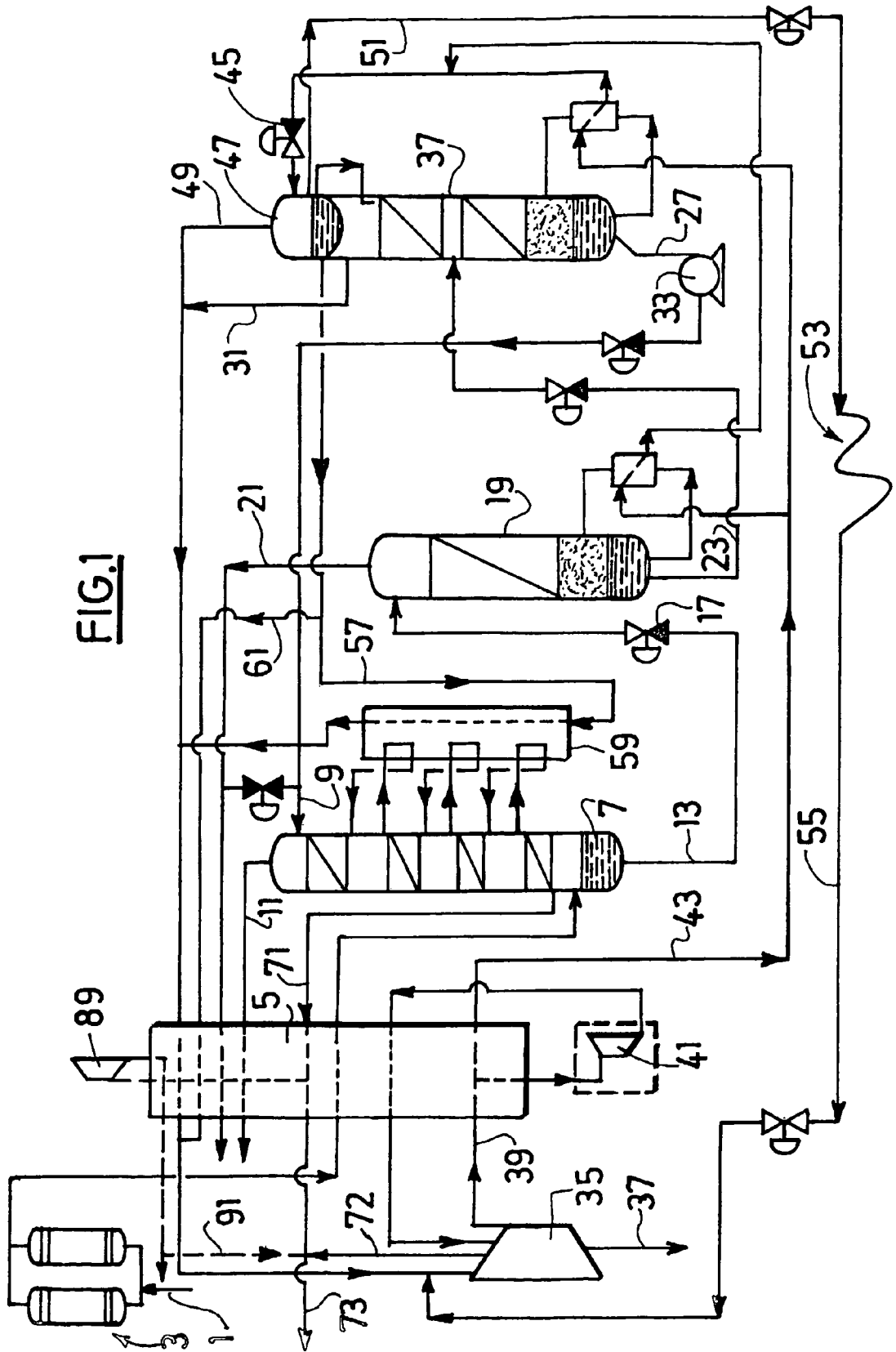

| | | | |
|---|---|---|---|
| 4,338,107 A * | 7/1982 | Swallow | 62/625 |
| 4,488,890 A | 12/1984 | Scholz et al. | |
| 4,772,301 A * | 9/1988 | Bauer | 62/625 |
| 4,888,035 A | 12/1989 | Bauer | |
| 5,295,356 A | 3/1994 | Billy | |
| 5,592,831 A | 1/1997 | Bauer et al. | |
| 5,642,630 A * | 7/1997 | Abdelmalek et al. | 62/632 |
| 6,062,042 A * | 5/2000 | McNeil et al. | 62/625 |
| 6,073,461 A * | 6/2000 | McNeil et al. | 62/625 |
| 6,082,134 A | 7/2000 | McNeil et al. | |
| 6,094,938 A * | 8/2000 | McNeil et al. | 62/632 |
| 6,269,657 B1 * | 8/2001 | McNeil | 62/631 |

FOREIGN PATENT DOCUMENTS

| | | |
|---|---|---|
| EP | 1 245 533 | 10/2002 |
| GB | 1 185 450 | 3/1970 |

* cited by examiner

PROCESS AND INSTALLATION FOR PROVIDING A FLUID MIXTURE CONTAINING AT LEAST 10% CARBON MONOXIDE

This invention concerns processes and installations for providing a fluid, preferably gaseous, mixture containing at least 10% carbon monoxide, preferably between 40 and 60% carbon monoxide. Such processes may also produce a further product comprising gaseous carbon monoxide containing at least 90% carbon monoxide.

Tieftemperaturtechnik by Hausen et Linde, Springer Verlag, 1985 describes the use of a mixture of carbon monoxide and hydrogen to feed an oxosynthesis process.

Examples of methane wash column systems to separated mixtures containing carbon monoxide and hydrogen are to be found in U.S. Pat. No. 6,269,657, U.S. Pat. No. 6,094,938, U.S. Pat. No. 6,082,134, U.S. Pat. No. 6,073,461, U.S. Pat. No. 6,062,042, U.S. Pat. No. 5,592,831, U.S. Pat. No. 5,295,356, U.S. Pat. No. 4,888,035, U.S. Pat. No. 4,311,496, U.S. Pat. No. 4,102,659, U.S. Pat. No. 3,886,756 and EP-A-837031.

All percentages mentioned are molar percentages and all pressures are absolute pressures.

According to the present invention, there is provided a process for producing a mixture containing at least 10% carbon monoxide, and possibly gaseous carbon monoxide, by cryogenic separation of a feed gas containing at least carbon monoxide, hydrogen and methane as principal components in a separation unit in a system of columns including a methane wash column, comprising the steps of
a) treating the feed gas to form a first gas enriched in hydrogen
b) scrubbing the feed gas or a gas derived from the feed gas with a liquid methane stream in a methane wash column,
c) withdrawing a gaseous hydrogen enriched stream from the methane wash column
d) separating a carbon monoxide enriched stream from the bottom of the methane wash column to produce a stream further enriched in carbon monoxide
e) separating the stream further enriched in carbon monoxide to form a carbon monoxide rich stream and a liquid methane stream
f) sending at least part of the liquid methane stream to the methane wash column and
g) mixing at least at least part of the carbon monoxide rich stream with the first gas enriched in hydrogen to form the mixture containing at least 10% carbon monoxide as a product stream.

The process may comprise the steps of purifying the feed gas using an adsorption step in one of at least two adsorbent beds to produce a purified feed gas to be sent to the separation unit, cooling at least part of the purified feed gas in a heat exchanger to form cooled purified feed gas, and sending the cooled purified feed gas to the methane wash column.

According to optional features of the process:
The feed gas is treated by being cooled down in a heat exchanger, then separated in a phase separator at an intermediate temperature of the heat exchanger or downstream the heat exchanger to form a gas enriched in hydrogen and at least part of the gas formed in the phase separator constitutes the first gas enriched in hydrogen and is mixed with at least part of the carbon monoxide rich stream to form the mixture containing at least 10% carbon monoxide as a product stream.
Part of the gas formed in the phase separator and/or at least part of the liquid formed in the phase separator is sent to the methane wash column, at least part of the gas formed in the phase separator which is not sent to the methane wash column constituting the first gas enriched with hydrogen.
The feed gas is treated in the methane wash column and the first gas enriched in hydrogen is removed at most a few theoretical trays above the bottom of the methane wash column.
The mixture containing at least 10% carbon monoxide contains at most 90% carbon monoxide, and preferably between 40 and 60% carbon monoxide and preferably between 10 and 90% hydrogen.
At least part of the first gas enriched in hydrogen is expanded in a turbine.
Using a carbon monoxide refrigeration cycle wherein a compressor of the refrigeration cycle compresses at least part of the carbon monoxide rich stream.
Part of the carbon monoxide rich stream is removed as a pure carbon monoxide product.

According to a further aspect of the invention, there is provided an installation for producing a mixture containing at least 10% carbon monoxide from a feed gas containing at least carbon monoxide, hydrogen and methane as principal components by cryogenic distillation including:
a) a first separation means for treating the feed gas to form a first gas enriched in hydrogen
b) a methane wash column and means for sending at least part of the feed gas or a gas derived from the feed gas to the methane wash column and means for sending a liquid methane stream to the top of the methane wash column
c) means for sending liquid from the bottom of the methane wash column to a second separation means, preferably a cryogenic distillation column, means for removing a hydrogen enriched stream and a carbon monoxide enriched stream from the second separation means
d) means for sending at least part of the carbon monoxide enriched stream to a third separation means, preferably a cryogenic distillation column, and means for removing a carbon monoxide rich stream and a methane rich stream from the third separation means
e) means for mixing at least part of the carbon monoxide rich stream with the first gas enriched in hydrogen to form the mixture containing at least 10% carbon monoxide as a product gas and possibly means for removing another part of the carbon monoxide rich stream as a product stream.

The installation may include:
means for treating at least part of the feed gas in the methane wash column wherein the first separation means is the methane wash column and the first gas enriched in hydrogen is removed at most a few trays above the bottom of the methane wash column
a phase separator constituting the first separation means, a heat exchanger for cooling the feed gas, means for removing the feed gas at an intermediate point of the heat exchanger or downstream the heat exchanger and sending the feed gas to the phase separator, means for removing the first gas enriched in hydrogen from the phase separator and preferably means for sending gas from the phase separator to the methane wash column as the gas derived from the feed gas
means for sending at least part of the liquid from the phase separator to the methane wash column and/or to the second separation means and/or to the heatexchanger
a turbine and means for sending at least part of the first gas enriched in hydrogen to the turbine.

The mixture containing at least 10% carbon monoxide preferably contains at least 10% hydrogen. Still more preferably the mixture contains between 40 and 60% carbon monoxide and between 40 and 60% hydrogen though the mixture may contain small quantities of other impurities such as methane or nitrogen.

To produce a mixture of carbon monoxide and hydrogen, the standard procedure is to mix purified flows of pure carbon monoxide and pure hydrogen to provide the desired ratio of carbon monoxide and hydrogen in the mixture.

The second separation means may be a stripping column or a phase separator.

The present invention reduces the size of the separation unit and in particular of the columns by purifying only that portion of the feed gas, which is to be transformed into pure products. This also leads to a reduction in energy costs. The hydrogen rich gas used to form the mixture is not in any of the columns of the separation unit.

The invention will now be described in greater detail with respect to the figure, which is highly simplified but contains the main elements of one installation according to the invention.

FIG. 1 shows an apparatus for separating a mixture containing principally methane, carbon monoxide and hydrogen. The mixture may also contain small amounts of nitrogen, carbon dioxide, humidity, higher hydrocarbons etc. This mixture is generally synthesis gas produced by a partial oxidation unit, a steam methane reformer or an autothermal reformer.

Figure 2:
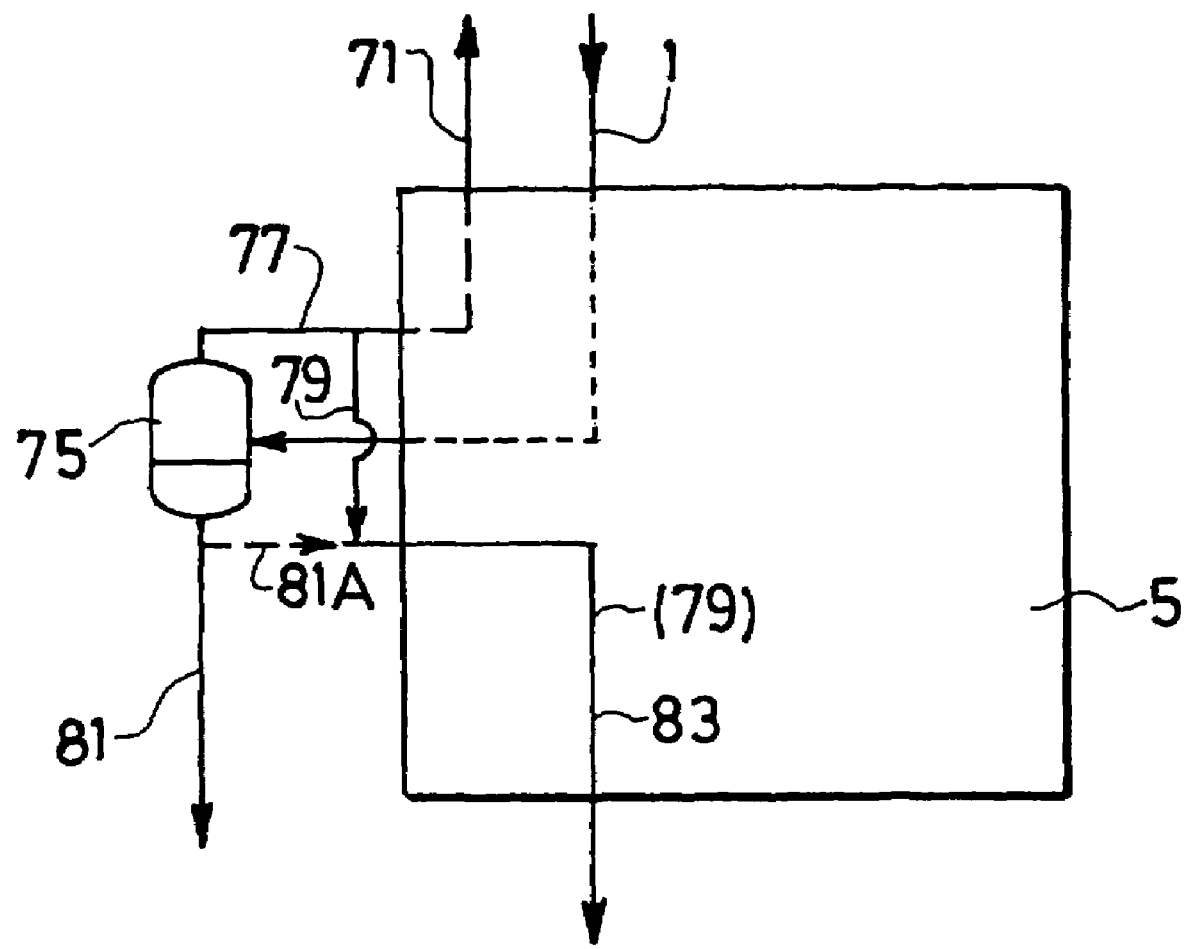

FIG. 2 shows an alternative feed gas arrangement for the process of FIG. 1.

In FIG. 1, the mixture 1 containing carbon monoxide, hydrogen, methane and possibly other impurities is purified in a front end purification unit 3 at around ambient temperature to removed water and carbon dioxide. Then the mixture is cooled to a cryogenic temperature in a heat exchanger 5 and sent to the bottom of a methane wash column 7 operating at a pressure between 10 and 60 bars. A methane wash stream 9 is fed to the top of column 7 and a hydrogen enriched stream 11 is removed from the top of the column. From the bottom of the column is removed a liquid stream 13 enriched in carbon monoxide.

A gaseous stream 71 enriched in hydrogen is removed before entering the methane wash column, or at the bottom of the methane wash column (the bottom of the column being used as a phase separator), or at a few trays above the bottom of the columns and is warmed in the heat exchanger 5. The gas 71 will be called raw gas.

Part or all of the gaseous stream 81 may be expanded in a turbine 89 to provide refrigeration for the process.

Stream 13 is further treated before being sent to the stripping column 19 which operates at between 4 and 17 bars, at least one feed stream formed from stream 13 being sent to the top of stripping column 19. Alternatively if a methane stream is fed to the top of stripping column 19, the feed stream is feed thereto at a lower point. The gas 21 from the top of the stripping column is warmed in the exchanger 5 and is used as fuel or burnt. The liquid stream 23 from the bottom of the stripping column 19 is further treated before being sent to the column 27. In particular, several feeds (liquid, dual phase, gaseous) at different levels may be provided to the column 27. Column 27 operates at between 1 and 10 bars, often around 2.5 bars. There it is separated to form a methane rich liquid 29 at the bottom of the column and a carbon monoxide rich gas 31 at the top of the column. Part of the methane rich liquid is pumped and sent to the top of the methane washing column and the rest is removed as a purge stream. The two portions of the methane rich liquid may be removed separately from the column. In this example, the methane rich liquid is pumped by pump 33 and sent in part to the top of the methane washing column 7 and the remaining purge stream is mixed with stream 21. The part to be mixed (or not) with stream 21 need not be pumped.

The carbon monoxide rich stream 31 may be compressed in a compressor 35 and part of it may be removed as a compressed CO product gas 37. However production of pure carbon monoxide is not an essential feature of the invention and all of the carbon monoxide produced may be used to form the mixture containing at least 10% carbon monoxide.

Another part of the carbon monoxide rich stream may be compressed in the compressor 35 and is then mixed as stream 72 with warmed stream 71 (and/or warmed expanded stream 91 from expander turbine 89) to form the mixture (called oxogas) containing at least 10% carbon monoxide and at least 10% hydrogen 73. There may be an oxogas compressor if needed.

Refrigeration for the system is provided by a carbon monoxide cycle of which the compressor 35 forms part. The carbon monoxide is compressed in compressor 35 to a pressure of between 10 and 60 bars. If needed, part of the compressed carbon monoxide 39 is cooled in exchanger 5 to an intermediate temperature of the exchanger and then expanded in turbine 41. The expanded carbon monoxide gas is warmed in the exchanger 5 and recycled to the compressor 35 at the entry thereof or an intermediate pressure thereof. The unexpanded carbon monoxide 43 serves to reboil columns 19 and 27 and the thereby cooled carbon monoxide is preferably subcooled, is expanded in valve 45 and sent to storage vessel 47.

In this particular case, the storage vessel 47 forms an integral part of the column 27 and additionally serves to provide reflux to the top of column 27, to supply liquid carbon monoxide to cool the methane wash column 7 and to supply liquid carbon monoxide directly to the main heat exchanger 5 where it is vaporised to balance the heat exchange diagram at the cold end of the heat exchanger 5.

Flash gas 49 produced by the expansion is mixed with the carbon monoxide rich gas 31 prior to compression.

A stream of liquid carbon monoxide 57 is vaporised in exchanger 59 against the gas streams within the methane wash column 7 and forms part of the gaseous carbon monoxide cycle.

A further stream of liquid carbon monoxide 61 withdrawn from the vessel 47 is vaporised in exchanger 5.

Both these liquid streams are withdrawn as part of the normal functioning of the process.

The storing of liquid carbon monoxide to be vaporised in vaporiser 53 is not an essential feature of the invention.

The process is used to produce a mixture containing at least 10% carbon monoxide, for example an oxogas used in the production of oxoalcohols.

FIG. 2 shows an alternative way of feeding the methane wash column in a process otherwise as shown in FIG. 1. Here the feed gas 1 is cooled to an intermediate temperature of the exchanger 5 (the warming gases are not shown) and is sent to a phase separator 75. There it separates to form a gas 77 and a liquid 81. The gas is divided in two, one part 71 being warmed and sent to form part of the at least 10% carbon monoxide mixture, preferably between 40 and 60% carbon monoxide mixture, after mixing with the carbon monoxide stream 72 of FIG. 1 and the rest 79 being cooled downstream of the heat exchanger 5 and sent to the bottom of the methane wash column 7. The liquid 81 can be sent either to methane wash column 7, either to flash column or drum 19, or either to exchanger 5 to be warmed. Alternatively the liquid stream 81A is mixed with the gas stream 79 to form dual phase stream as shown in dashed lines and the mixture 83 is then further cooled and fed to the methane wash column 7.

The invention claimed is:

1. A process for producing a mixture (73) containing at least 10% carbon monoxide by cryogenic separation of a feed gas (1) containing at least carbon monoxide, hydrogen and methane as principal components in a separation unit in a system of columns including a methane wash column (7), comprising the steps of
   a) treating the feed gas to form a first gas stream enriched in hydrogen;
   b) scrubbing the feed gas or a gas derived from the feed gas with a liquid methane stream (9) in the methane wash column;
   c) withdrawing a second gaseous stream enriched in hydrogen from the methane wash column;
   d) separating a first carbon monoxide enriched stream (13) from the bottom of the methane wash column to produce a second carbon monoxide enriched stream;
   e) separating the second carbon monoxide enriched stream to form a third carbon monoxide rich stream and a liquid methane stream (27);
   f) sending at least part of the liquid methane stream to the methane wash column; and
   g) mixing at least part of the third carbon monoxide rich stream with the first gas stream enriched in hydrogen to form the mixture containing at least 10% carbon monoxide as a product stream.

2. The process of claim 1 comprising the steps of purifying the feed gas using an adsorption step in one of at least two adsorbent beds (3) to produce a purified feed gas to be sent to the separation unit, cooling at least part of the purified feed gas in a heat exchanger (5) to form cooled purified feed gas, and sending the cooled purified feed gas to the methane wash column (7).

3. The process of claim 1 wherein the feed gas is treated by being cooled down in a heat exchanger (5), then separated in a phase separator (75) at an intermediate temperature of the heat exchanger or downstream of the heat exchanger to form the first gas stream enriched in hydrogen, wherein at least part of the gas formed in the phase separator constitutes the first gas enriched in hydrogen and is mixed with at least part of the third carbon monoxide rich stream to form the mixture (73) containing at least 10% carbon monoxide.

4. The process of claim 3, wherein part (79) of the gas formed in the phase separator and/or at least part of the liquid (81, 81A) formed in the phase separator is sent to the methane wash column, and at least part of the gas formed in the phase separator which is not sent to the methane wash column constitutes the first gas stream enriched with hydrogen.

5. The process of claim 1, wherein the feed gas (1) is treated in the methane wash column (7) and the first gas stream enriched in hydrogen is removed at most a few theoretical trays above the bottom of the methane wash column.

6. The process of claim 1, wherein the mixture containing at least 10% carbon monoxide (73) contains at most 90% carbon monoxide.

7. The process of claim 1, wherein at least part (87) of the first gas stream enriched in hydrogen is expanded in a turbine (89).

8. The process of claim 1, wherein a compressor (35) of a refrigeration cycle compresses at least part of the third carbon monoxide rich stream.

9. The process of claim 1, wherein part of the third carbon monoxide rich stream is removed as a carbon monoxide product having a purity of greater than 90%.

10. An installation for producing a mixture (73) containing at least 10% carbon monoxide from a feed gas containing at least carbon monoxide, hydrogen and methane as principal components by cryogenic distillation including:
    a) a first separation means (7, 75) for treating the feed gas to form a first gas stream enriched in hydrogen;
    b) a methane wash column (7);
    c) means for sending at least part of the feed gas (1) or a gas (79) derived from the feed gas to the methane wash column;
    d) means for sending a liquid methane stream (9) to the top of the methane wash column;
    e) means for sending liquid from the bottom of the methane wash column to a second separation means (19);
    f) means for removing a second hydrogen enriched stream (21) and a first carbon monoxide enriched stream (23) from the second separation means;
    g) means for sending at least part of the second carbon monoxide enriched stream (23) to a third separation means (27);
    h) means for removing a third carbon monoxide rich stream and a methane rich stream (27) from the third separation means;
    i) means for mixing at least part of the third carbon monoxide rich stream with the first gas stream enriched in hydrogen to form the mixture (73) containing at least 10% carbon monoxide as a product gas.

11. The installation of claim 10 including means for treating at least part of the feed gas in the methane wash column wherein the first separation means is the methane wash column (7) and the first gas stream enriched in hydrogen is removed at most a few trays above the bottom of the methane wash column.

12. The installation of claim 10 including a phase separator (75) constituting the first separation means, a heat exchanger (5) for cooling the feed gas, means for removing the feed gas at an intermediate point of the heat exchanger or downstream of the heat exchanger and sending the feed gas to the phase separator, and means for removing the first gas stream enriched in hydrogen from the phase separator.

13. The installation of claim 12 comprising means for sending at least part of the liquid (81, 81A) from the phase separator to the methane wash column (7) and/or the second separation means (19) and/or to the exchanger (5).

14. The installation of claim 10 comprising a turbine (89) and means for sending at least part (87) of the first gas enriched in hydrogen to the turbine.

15. The process of claim 6, wherein the mixture contains between 40% and 60% carbon monoxide.

16. The process if claim 6, wherein the mixture contains between 10% and 90% hydrogen.

17. The installation of claim 10, further comprising means for removing another part of the third carbon monoxide rich stream.

18. The installation of claim 12, further comprising means for sending gas from the phase separator to the methane wash column as the gas derived from the feed gas.

* * * * *